United States Patent [19]

Riggle et al.

[11] Patent Number: 4,968,985

[45] Date of Patent: Nov. 6, 1990

[54] DATA DEMODULATION SYSTEM

[75] Inventors: Charles M. Riggle, Colorado Springs, Colo.; Lih-Jyh Weng, Lexington, Mass.

[73] Assignee: Digital Equipment Corporation, Maynard, Mass.

[21] Appl. No.: 202,882

[22] Filed: Jun. 6, 1988

[51] Int. Cl.$^5$ .............................................. H03M 7/42
[52] U.S. Cl. .................................. 341/106; 341/107; 364/900; 364/955.5
[58] Field of Search .................... 341/110, 155, 79, 51, 341/95, 106, 107; 364/955.5, 960.5; 360/29, 32; 369/32

[56] References Cited

U.S. PATENT DOCUMENTS

4,309,772 1/1982 Kloker et al. ........................ 341/106

Primary Examiner—William M. Shoop, Jr.
Assistant Examiner—Brian K. Young
Attorney, Agent, or Firm—Nutter, McClennen & Fish

[57] ABSTRACT

A data demodulator assigns a binary value to the signal recorded in a transition cell based on the amplitude of the signal in the transition cell, the amplitudes of the signal in adjacent transition cells and system experience in categorizing how recording non-linearities and system noise effect the signals. The demodulator samples a selected number of times the recorded signal in the transition cell for which a binary value is to be determined and the recorded signal in a selected number of transition cells adjacent to that cell. It then converts the amplitude of each of the signal samples to a digital symbol. Next, it concatenates portions of the digital symbols to form an interpretation word. It uses this word to enter a stored lookup table which contains binary values, and assigns to the transition cell signal the binary value associated with the word. The table associates a value with a particular word or group of words based on system experience and the demodulation of known signals into interpretation words. The binary values assigned to a number of cells may be combined to form a code word which may be decoded and corrected using soft decoding techniques.

13 Claims, 8 Drawing Sheets

$A = \{A.0, A.1, A.2, \ldots, A.n\}$  $B = \{B.0, B.1, B.2, \ldots, B.n\}$ $$\text{Distance}(A,B) = \left[\frac{(A.0-B.0)^2 + (A.1-B.1)^2 \ldots + (A.n-B.n)^2}{n}\right]^{\frac{1}{2}}$$

Example: For Word = -4, -4, 0, 4, 1

| BIT DECISION | CONFIDENCY RATING FROM LOOK-UP TABLE DEMODULATION | | | | | | |
|---|---|---|---|---|---|---|---|
| 1 | 0.9 | 0.3 | 0.3 | 0.5 | 0.6 | 0.8 | 0.9 |
| 0 | 0.1 | 0.7 | 0.7 | 0.5 | 0.4 | 0.2 | 0.1 |
| BIT POSITION | 1 | 2 | 3 | 4 | 5 | 6 | 7 |

TABLE 1

DATA DEMODULATION SYSTEM

FIELD OF INVENTION

The invention relates generally to the field of signal demodulation and more particularly to the demodulation of a signal which has a low signal-to-noise ratio, for example, signals recorded on mass storage media used for storing data in a digital data processing system to identify the digital data represented thereby.

BACKGROUND

Binary digital data is typically recorded on mass storage media as a pattern of transitions in a storage medium. For example, data on magnetic storage media is represented by changes of magnetic polarity, and data on optical storage media may be represented by changes in reflectivity or transmissivity. The transition patterns correspond to digital data which have been encoded to facilitate recording. When a magnetic memory is read using an inductive read head, or an optical memory is read using an optical scanner, an analog signal is generated with relative positive and negative peaks or large and small signals corresponding to the transition pattern. The analog signal, which may be distorted by system noise and other influences, which may be non-linear, is then demodulated to extract the original transition pattern as faithfully as possible and interpret it as a series of binary encoded bits. The binary encoded bits must then be decoded to reproduce the original digital data.

Signal demodulation may become increasingly difficult as the density of data recorded on the disks is increased. With higher recording densities, the medium, or disk, space allotted for the recording of a transition signal, that is, a transition cell, is, in effect, reduced. The signals read from the transition cells relative to the background noise tend to be smaller as a result and they can be more readily misinterpreted.

The signals may be misinterpreted because of system noise, which can distort the signals read from the "small" transition cells, or because of interference from surrounding transition cells, which can cause signal peaks to shift within a transition cell or even to adjacent transition cells. The misinterpretation of the transition signals results in errors in the binary encoded bits which, after decoding, results in errors in the digital data.

The extent of the resulting digital data errors, due to misinterpretation of the signal because of distortion from noise or peak shifts, is categorized as a soft bit error rate. Soft errors must be corrected by the system's error correction process before the data can be used in data processing. Thus the error rate that the system error correction code ("ECC") can correct implicitly becomes a limitation on the recoding density. If recording densities are to increase over current densities, either the ratio of signal-to-system noise, including peak shifts, must be improved or the signal processing which is used to generate and recover recorded signals must be improved. One method for such improvement is to more faithfully interpret recorded signals during the demodulation process.

Various demodulation systems, which are aimed at faithful signal interpretation, are currently in use. Some less complicated systems employ amplitude detectors and peak detectors which detect the presence of signals with amplitudes, or peaks, within certain ranges and interprets them as binary encoded bits. Other, more sophisticated, systems employ various forms of signal processing to filter and enhance the analog signal before the amplitudes or peaks are detected. These techniques work well for current recording densities. However, as recording densities increase and as the likelihood of distortion by system noise and peak shift by adjacent-cell interference also increases, the demodulation techniques must become more sophisticated to faithfully interpret the binary encoded bits.

SUMMARY OF INVENTION

The invention provides a new and improved signal demodulator for demodulating an analog signal, for example, representing stored data on magnetic or optical storage media which allows more faithful interpretation of information in the signal. The demodulator can thus demodulate data recorded at higher recording densities and/or with a lower signal-to-noise ratio, and retain an error rate, or quality of signal interpretation, which is compatible with existing error correction capabilities.

In brief summary, the improved demodulator assigns a digital value to the signal recorded in a transition cell based on (i) the amplitude of the signal in the transition cell, (ii) the amplitudes of signals in adjacent transition cells, and (iii) system experience in categorizing how recording non-linearities and system noise affects the signals. To identify a binary value corresponding to a signal in a transition cell, the recorded analog signal in the transition cell and a selected number of transition cells adjacent to the cell are each sampled a selected number of times in each transition cell. The amplitude of each of the signal samples is then converted to an m-bit digital signal symbol. Next, the digital signal symbols from each of the signal samples, or portions of the digital symbols, are concatenated to form an interpretation word or vector. The interpretation word is then used to enter a stored look-up table, that is, the interpretation word is used as an address to access a memory location, which contains a binary value for the transition cell.

The entries in the look-up table may be determined by system experience. First, interpretation words are formed for signals read from known data strings and a binary value is associated with each of the interpretation words. Thus interpretation words are formed for known signals which may be distorted by system noise or peak shifts. Then the binary value most frequently associated with a particular interpretation word is stored in the look-up table, that is, stored in a memory location addressed by the interpretation word.

The interpretation words are used to enter the stored look-up table, that is, the interpretation words are used to address the memory locations containing the look-up table. Then the value stored at the address, which represents a good estimate for the binary value of the associated transition cell based on numerous encounters with identical interpretation words, is assigned to the transition cell. Thus the error rate is kept to a minimum, that is, the quality of the signal interpretation is optimized, for purposes of obtaining higher recording densities and/or operation at lower signal-to-noise ratios.

BRIEF DESCRIPTION OF THE DRAWINGS

The invention will be pointed out with particularity in the appended claims. The above and other advantages of the invention may be better understood by referring to the following description taken in conjunction with the accompanying drawings, in which:

FIG. 4 is an illustration of a method for filling the look-up table shown in FIG. 2;

DETAILED DESCRIPTION

Figure 1:
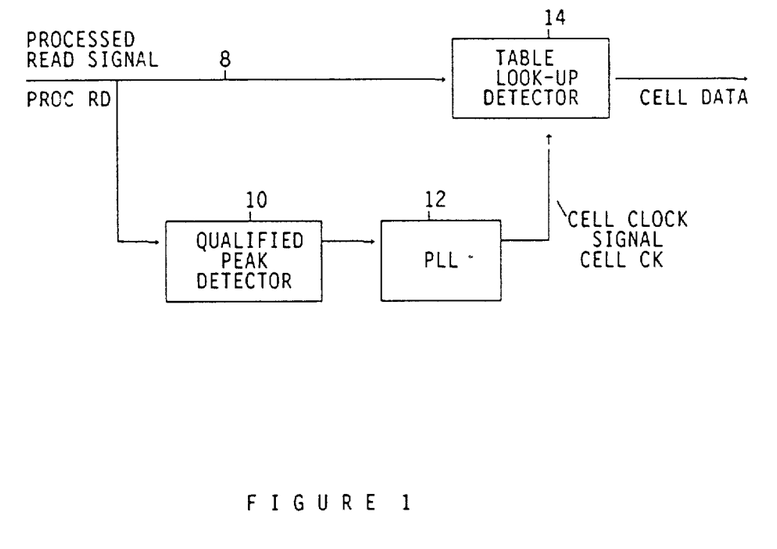
FIG. 1 is a functional block diagram of a demodulator constructed in accordance with the invention.

FIG. 1 depicts a functional block diagram of a demodulator constructed in accordance with the invention. With reference to FIG. 1, a recorded signal read from memory (not shown), is processed, that is, amplified, filtered, etc., by conventional circuitry (not shown), resulting in a PROC RD processed read signal on line 8. The PROC RD processed read signal is coupled to both a qualified peak detector 10 and a table look-up detector 14. The qualified peak detector 10, which is of conventional design, applies pulses to the input of a phase-lock loop 12, which is also of conventional design. The pulses correspond to "qualified" peaks in the PROC RD processed read signal, that is, signal peaks (positive or negative) within a predetermined range, as opposed to noise spikes which are typically outside of the predetermined range. In response to the pulses, the phase-lock loop 12 generates a CELL CK cell clock signal, which constitutes a series of pulses that effectively define sequential transition cells, $B_j$. The CELL CK cell clock signal is then applied to clock the table look-up detector 14. The number of pulses which define a transition cell are determined by a sampling strategy selected, as discussed below.

The table look-up detector 14, which is described in more detail with reference to FIG. 2 below, samples the PROC RD processed read signal at least once in every transition cell and converts the signal samples to m-bit digital symbols representing the amplitude of the PROC RD processed read signal. The digital symbols for a current transition cell, $B_j$, and a selected number of preceding and succeeding transition cells are then utilized to form an interpretation word. The interpretation word is used as an address to access a stored look-up table and assign a binary value corresponding to the interpretation word to the current transition cell $B_j$. The number of transition cells used in forming the interpretation word depends on the sampling strategy selected, as discussed below.

Interpretation words are then formed for succeeding transition cells using an iterative process. Thus the samples of certain of the transitions cells used in forming the interpretation word for cell $B_j$, together with additional samples taken from succeeding transition cells, are used in forming the interpretation word for cell $B_{j+1}$. The iterative process for forming interpretation words is repeated until each transition cell having the appropriate number of preceding and succeeding cells is assigned a binary value, or until each transition cell containing a signal associated with data is assigned a binary value. Transition cells for which interpretation words are not formed, for example, cells at the beginning and end of a data stream, may be interpreted by conventional means, or not interpreted.

Figure 2:
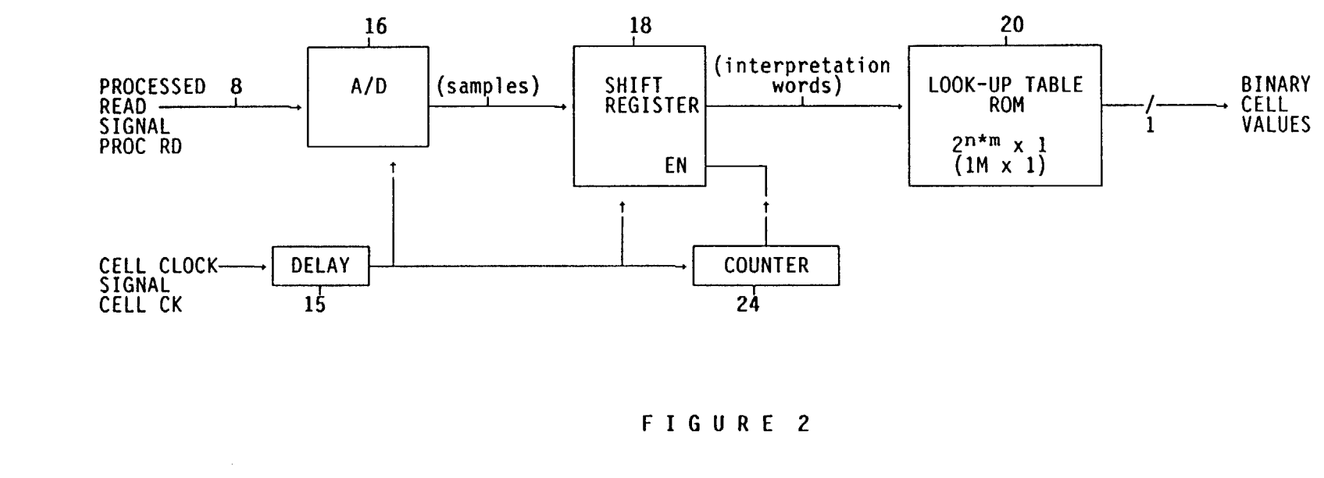
FIG. 2 is a functional block diagram of the table look-up detector used in the demodulator shown in FIG. 1.

FIG. 2 depicts a detailed block diagram of the table look-up detector 14. With reference to FIG. 2, the detector 14 consists of a delay 15, an analog-to-digital ("A/D") converter 16, a shift register 18, and a look-up table comprising a read-only memory ("ROM") 20. The ROM 20 may be replaced by any pre-loaded memory, for example, a random access memory. The PROC RD processed read signal is coupled to the input terminal of the A/D converter 16. When the A/D converter 16 is enabled by the CELL CK cell clock signal from the phase-lock loop 12 (FIG. 1), it samples the PROC RD processed read signal. The delay 15 operates to position the pulse of the CELL CK cell clock signal such that the A/D converter 16 samples the PROC RD processed read signal at a location or locations within each transition cell which are selected as part of the sampling strategy. The PROC RD processed read signal is thus sampled one or more times in each transition cell, where the number of samples taken, that is, the number of CELL CK signal pulses comprising a transition cell, depends on the sampling strategy used (as discussed below). Initially it will be assumed that one sample is taken per cell. Thereafter, the general case of "n" samples per cell will be discussed.

The A/D converter 16 generates, in response to the amplitude of each sample, an m-bit digital symbol, where m may be, for example, eight bits, the high order bit representing the sign and the remaining bits representing the magnitude of the PROC RD processed read signal samples. The A/D converter 16 is of conventional design, it may be either linear or non-linear depending on the characteristics of the PROC RD processed read signal. The sign bit and a selected number of the high-order magnitude bits from each of the digital symbols are then shifted into the shift register 18 in response to a pulse in the CELL CK cell clock signal.

The various bits stored in the shift register 18 are effectively concatenated to form an interpretation word or vector, which is used to access a look-up table stored in the ROM 20, that is, the interpretation word is used to address a memory location in the ROM 20. The value stored at the addressed location is then assigned to the transition cell which is associated with the samples stored in the shift register 18.

It will be appreciated that each time the shift register 18 is clocked, the contents of the register are shifted such that a sample associated with each of the transition cells is shifted up with the earliest sample shifted out of the register, and a new digital symbol relating to the next sample shifted into the shift register 18.

After a new sample is taken, the contents of the sample shift register 18 are concatenated to form the interpretation word for the transition cell immediately following the previous transition cell $B_j$, that is, cell $B_{j+1}$. The look-up table is again accessed using the new interpretation word and a binary value is assigned to transition cell $B_{j+1}$.

The process is repeated for each subsequent transition cell until a value has been assigned to every transition cell for which interpretation words can be formed, that is, each transition cell for which samples can be obtained for the required number of preceding and succeeding transition cells.

It will be recognized that at the beginning or end of a reading operation there may not be a requisite number of preceding or succeeding transition cells to form a complete interpretation word. In those cases, the look-up table need not be used to assign a binary value to the cell. Instead the cell will be assigned a binary value by a conventional method or by random assignment, or a value will not be assigned. The first few bits and the last few bits of a recorded data stream are typically used for bit synchronization and/or fill rather than data and, thus, the cell signals may not require faithful demodulation.

As noted above, multiple samples, for example, "n" samples, may be used for each transition cell. In that case, the A/D converter 16 and the shift register 18 each operate n times, that is, once for each sample, before an interpretation word is formed. When the output of shift register 18 is enabled by a signal from a counter 24 (FIG. 2), after the shift register 18 has shifted n times, the interpretation words are formed using portions of each of the n cell samples from a selected number of cells. Binary values are then assigned to the cells in the manner discussed above.

Figure 3:
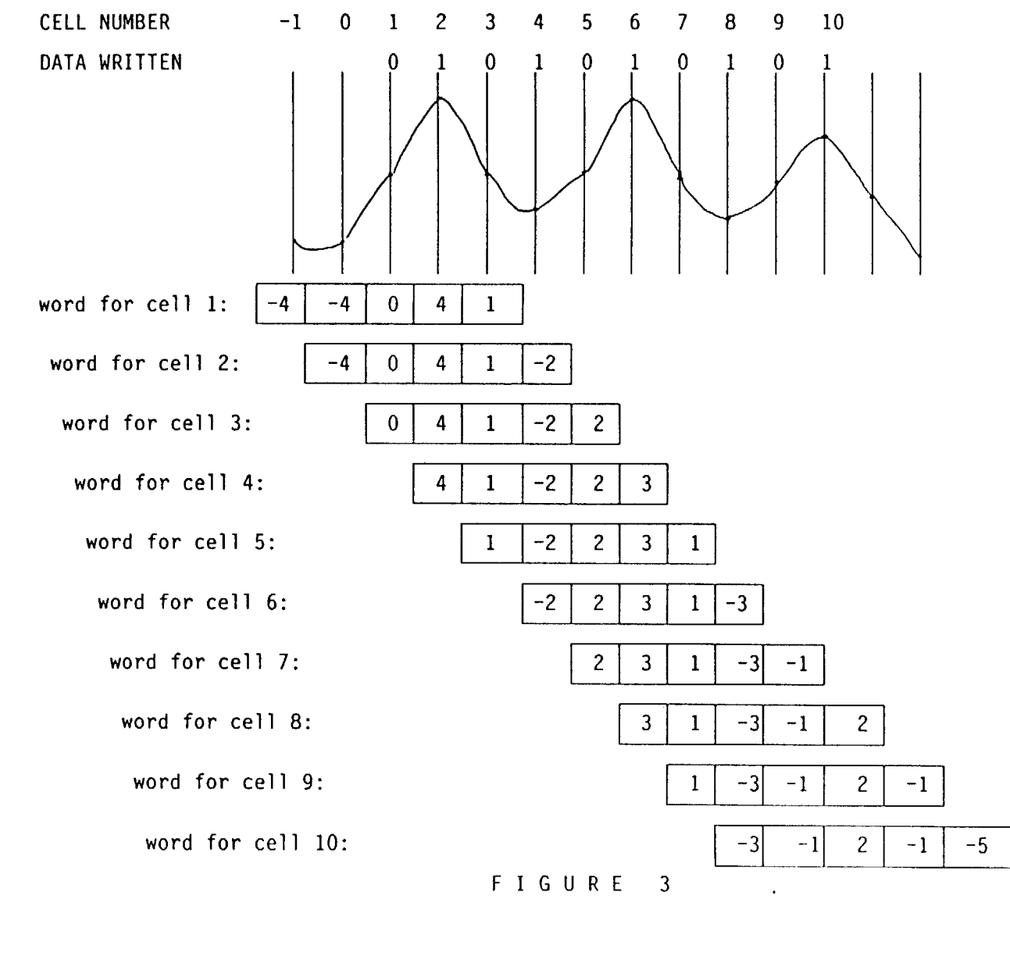
FIG. 3 is a diagram of transition cells illustrating the sampling technique used to create the look-up table shown in FIG. 2.

The operation of table look-up detector 14 will be further explained in connection with FIG. 3, which also illustrates one particular sampling strategy. Each transition cell is sampled once and the samples from five consecutive transition cells are used to form an interpretation word. The interpretation word for cell number 1, for example, uses the samples from transition cells $-1$, 0, 1, 2 and 3. The number of cells used to form the interpretation word is determined by the sampling strategy used, and the number of cells selected need not be symmetrical around the transition cell to be assigned the binary value, transition cell number 1 in this example.

The A/D converter 16 (FIG. 2) generates m-bit digital symbols representing the amplitude of the analog signal samples. Then a selected number, x, of bits from each of the m-bit digital signals are stored in the shift register 18 (FIG. 2) for use in forming interpretation words. The number of bits selected for inclusion in an interpretation word depends on the sampling strategy used. In one embodiment, four bits are selected from each of the m-bit digital symbols, for example, the sign bit and the three high order magnitude bits. The shift register 18 stores the selected four bits from each of the digital symbols, and these bits are output as the interpretation word associated with transition cell number 1. Thus using a value of n=5, the interpretation word contains twenty bits. The twenty-bit interpretation word is then used to access the look-up table stored in the ROM 20 (FIG. 2), that is, it addresses a memory location in the ROM 20, and the binary value stored in the addressed location is assigned to transition cell number 1.

Next, the A/D converter 16 samples the signal in transition cell number 4 and generates an m-bit digital symbol representing the amplitude of the signal. The digital symbol is applied to the shift register 18, which stores the x bits selected from the symbol and shifts out the bits corresponding to the sample from transition cell $-1$. The shift register 18 thus contains the x selected bits from each of the digital symbols associated with transition cells numbers 0 through 4 and the interpretation word for transition cell number 2 is formed therefrom.

The interpretation word is then used to address the ROM 20, and the binary value stored at the addressed memory location is assigned to transition cell number 2. The process is repeated until transition cells 3 through 10 are assigned binary values from ROM 20. Interpretation words for the transition cells $-1$, 0, 11 and 12 are not generated because the cells do not have the requisite number of preceding or succeeding transition cells, and other conventional techniques may be used to determine values for these cells, including arbitrary assignment of binary values, or perhaps no assignment is made.

The entries in the look-up table stored in the ROM 20 (FIG. 2) are based on system experience. One method for creating the look-up table is as follows. First, known data strings are encoded and written to memory. The known encoded data strings are then read from memory and interpretation words are formed for the encoded data based on a selected sampling strategy (as discussed below). Next, the interpretation words are assigned the known transition cell values. Then, after many encoded data strings are read, the value most frequently associated with a particular interpretation word is entered in the look-up table by storing it in the ROM 20 at the address corresponding to the interpretation word.

If all possible interpretation words are encountered by reading the known encoded data strings, the look-up table is filled. If all possible interpretation words are not encountered, an algorithm may be employed to assign binary values to the remaining interpretation words, and the binary values are entered in the look-up table, that is, the values are stored in the ROM 20 (FIG. 2) at the addresses corresponding to the interpretation words.

An algorithm used to assign binary values to the interpretation words may, for example, be based on observed patterns in the encoded data and associated interpretation words, and on basic assumptions relating to system noise. The algorithm used in one embodiment is based on observed noise and data patterns, and the assumptions that perturbations in the PROC RD processed read signal may result in different interpretation words for the same transition cell signal value and that the different interpretation words will most likely be within a certain "distance" of each other. In this context, "distance" is defined as the root mean square of the difference between corresponding samples, where each sample is a selected number of bits, in two interpretation words.

Thus, if an interpretation word A contains samples $A_1, A_2, A_3, A_4, \ldots A_N$, and an interpretation word B contains samples $B_1, B_2, B_3, B_4, \ldots B_N$, the distance, D, between A and B is defined as $$\left[ \frac{(A_1 - B_1)^2 + (A_2 - B_2)^2 + (A_3 - B_3)^2 + (A_4 - B_4)^2 + \ldots + (A_N - B_N)^2}{N} \right]^{\frac{1}{2}}$$

A maximum value for the distance, D, is chosen based on system experience, and interpretation words formed using the distance formula which are within D of an interpretation word with a known binary value are assigned the known value of the nearest interpretation word.

If an interpretation word $I_0$ is equally distant from two interpretation words, $I_1$ and $I_2$, with different known binary values, word $I_0$ may be assigned the value associated most frequently with either $I_1$ or $I_2$. The choice of the value to be associated with word $I_0$ may depend, for example, on the relative frequencies with which $I_1$ or $I_2$ have been encountered in demodulating the known data or the percentage of times $I_1$ or $I_2$ were associated with the values assigned to them. Thus if, for example, $I_1$ is associated with the value ONE nine out of ten times and $I_2$ is associated with the value ZERO eight out of ten times, interpretation word $I_0$ is assigned the value ONE. If $I_1$ and $I_2$ are each associated with a particular value the same percentage of times, $I_0$ may be arbitrarily assigned a value.

FIG. 4 illustrates the results of using this algorithm for the interpretation word associated with transition cell 1 (FIG. 3), that is, $-4,-4,0,4,1$, with the maximum distance D equal to two. Thus each of the words formed using the algorithm, for example, $-3,-4,0,4,1$ and $-3,-3,0,4,1$, are assigned a value of 1 and a 1 is stored in all of the ROM 20 locations addressed using the interpretation words within distance 2 of $-4,-4,0,4,1$. In one embodiment the maximum distance used is seven, and thus the same technique of assigning a binary value to the interpretation words and storing the values in the ROM 20 is followed for distances three through seven. If any ROM locations addressed by possible interpretation words are not filled after using the algorithm, the locations may be randomly assigned ONES or ZEROS, such that all possible interpretation words have corresponding binary values.

Another method used in creating the look-up table is to encode noise-free data and fill-in the table with as many entries as possible. Controlled amounts of noise are then added to the encoded data to fill-in additional table entries, and finally the algorithm is used to complete the table entries. Various combinations of the two methods of table filling can also be used to fill the table in accordance with system characteristics.

The sampling strategy used to generate the interpretation words is based on system experience and various assumptions made about the system. In one embodiment, the basic assumption made about the system is that the energy of a data signal is most heavily concentrated in its own transition cell. This assumption leads to the decision to limit sampling to a small number of adjacent transition cells. Additionally, decisions were made to (i) use the same sampling precision for each sample, that is, the same bits are selected from each digital symbol representing the amplitude of the sampled analog signal, (ii) use one sample at the center of each transition cell, (iii) sample five adjacent transition cells, that is, transition cell $B_0$ and the two transition cells immediately before it and immediately after it, and (iv) select four bits from each digital symbol, that is, the sign bit and the three high-order magnitude bits. Thus twenty-bit interpretation words are formed for each transition cell which has the requisite adjacent transition cells.

Many other strategies which are designed following the assumptions set forth above could be used. For example, if the transition cell to be assigned a binary value is cell $B_0$, any strategy can be used which samples cells $B_{-i}, B_{-i+1}, \ldots, B_0, B_1, \ldots B_j$, where "i" may or may not equal "j", and selects particular bits from the digital symbol associated with each sample to form interpretation words. It will be appreciated by those skilled in the art that the various assumptions and decisions about a system must take into account the recording medium used, the recording channel characteristics of the system, and many other system-dependent signal characteristics, as well as known sampling limitations such as the Nyquist sampling rate. Thus sampling strategies may differ significantly between systems.

An additional refinement of the system involves performing a logical function on the interpretation words before they are applied as addresses to the look-up table. Such a function may take advantage of known properties of the signal, thereby reducing the number of bits applied to the look-up table and thus reducing the required size of the look-up table. For example, if the signal is symmetric about an amplitude of 0, a given interpretation word should assign the same binary value to a transition cell as the inverse of the interpretation word, that is, the word formed by inverting all the sample values. Thus the logical function will normalize the interpretation word to a positive center sample value, for example, by inverting all values in an interpretation word if the center cell value is negative. This function has the effect of making the sign bit of the center sample redundant, and therefore, the size of the look-up table is reduced by a factor of two. In the example given above, the interpretation words are formed by taking four bits from each of five samples to form a twenty-bit interpretation word, and thus, there are $2^{20}$ addressable memory locations. Using the logical function just described, the interpretation word will contain only 19 bits and the look-up table will have $2^{19}$ addressable memory locations.

In another embodiment, the look-up table 14 (FIG. 1) contains, for each interpretation word, a binary value, as discussed above, and an associated confidence rating. The confidence rating, which is determined when the table is filled, identifies a confidence level with which a binary value is associated with an interpretation word. Thus the confidence level is based on system experience.

During the table-fill process interpretation words are formed for known data strings. If an interpretation word is associated with the same binary value each time it appears during the table-fill process, and if that interpretation word is encountered relatively frequently, it is fairly certain that cells represented by that interpretation word have the associated binary value. Thus the confidence rating stored in the look-up table along with the associated binary value is high. If, however, a particular interpretation word is associated with one binary value approximately fifty percent of the time, or if that interpretation word has been encountered relatively infrequently, the certainty with which a particular binary value is associated with that interpretation word is low, and thus the confidence rating stored in the look-up table is low.

There are several methods which may be used in conjunction with the confidence rating in performing "soft decoding", that is, formulating a best estimate for a group of encoded data bits and double checking the estimate with, for example, a parity bit to determine if the soft decoding results in a code word, i.e. if the parity of the estimate is correct.

If a parity bit is used, encoded binary bits are stored in groups of, for example, nine bits, with each group consisting of eight encoded data bits and one parity bit. Typically an odd parity is used to ensure that there will be at least one flux reversal in a group. When the recorded data is demodulated, the demodulator assigns each transition cell a preliminary binary value and an associated confidence rating. Then, after preliminary value assignments are given to all eight of the group transition cells, the parity bit of that group is checked against the correct value. If the parity bit is correct, the preliminary values are assigned to the transition cells and the bits are then decoded to reproduce the encoded data.

If the group parity bit is not correct, one method of forming a "better" estimate of the encoded data is to switch the binary value of the bit with the lowest confidence rating from a ZERO to a ONE or a ONE to a ZERO, and then assign transition cells in the group the resulting binary values. This increases the probability that the correct binary value is assigned to each transition cell since the bit with the lowest confidence rating is the one most likely to be in error.

Figure 5:
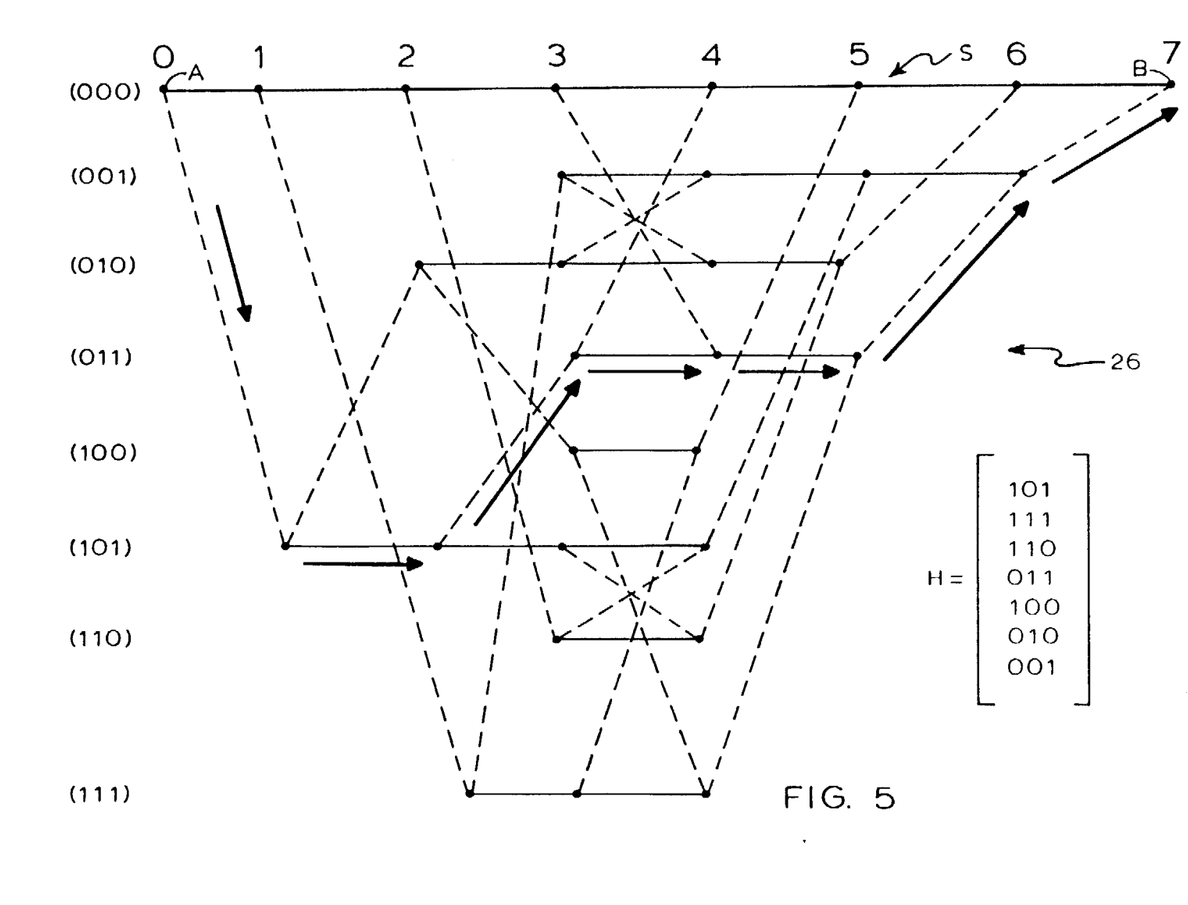
FIG. 5 is a graphic representation, or trellis, of a code used to encode the data.

Another method of forming a better estimate of the encoded groups is known as "maximum likelihood" decoding. The (n,k) error correction code used to encode the data can be graphically represented by a trellis as described in the IEEE Transactions on Information Theory article by Jack K. Wolf entitled "Efficient Maximum Likelihood Decoding of Linear Block Codes Using a Trellis" published in Volume IT-24, No. 1, January 1978, pages 76-80. FIG. 5 herein shows a trellis 26 for a (7,4) code. The trellis 26 has $2^{(n-k)}$, or $2^3$, levels, with each level labelled according to a row in the (7,4) code parity-check matrix, H.

Every code word of the (7,4) code is represented by a path in the trellis 26 from node A to node B. Specifically, a code word, consisting of seven bits, is found by tracing a seven leg path through the trellis 26 from node A to node B, with each path leg representing a code word bit. The solid, horizontal lines represent ZEROS and the dashed, partly vertical lines represent ONES.

An exemplary code word path for the code word corresponding to the data 1010 is shown by the arrows in FIG. 5. Starting at the node A, the first bit is a ONE and thus the dashed leg extending from node A to the node at the 101 level is followed. The level at which this leg ends corresponds to the result of exclusive OR'ing the label associated with the previous level of the path with the product of the first bit and the first row of the parity-check matrix H:

000 + (1)(101) = 101.

Where "+" represents the exclusive-OR operation.

The second bit is a ZERO, represented by the solid leg extending from the first node at level 101 to the second node at the same level. The level at which this leg ends corresponds to the result of exclusive OR'ing the label associated with value of the previous level with the product of the ZERO bit and the second row of the parity-check matrix H:

101 + (0)(111) = 101.

The third bit is a ONE, represented by the dashed leg from the second node at level 101 to the first node at the 011 level. The level at which this leg ends corresponds to the result of exclusive OR'ing the label associated with the previous level with the product of the third bit and the third row of the parity-check matrix H:

101 + (1)(110) = 011.

The fourth bit is a ZERO, represented by the dashed leg from the 011 node to the next node at the 011 level. The level at which this leg ends corresponds to the result of exclusive OR'ing the label associated with the previous level with the product of the fourth bit and the fourth row of the parity-check matrix H. Thus this leg ends at the same level as the previous leg. The remaining three legs of the code word path are identified by the level at which the fourth leg of the path ends. That is, they follow the route corresponding to that level. In this example the fourth leg ends at the level 011. Thus the fifth, sixth and seventh legs of the path, corresponding to the fifth, sixth and seventh bits of the code words are 011. The resulting code word, C, in this example is thus 1010011. It will be appreciated that each node representing a fourth code word bit has exactly one route to node B.

The fact that C is a (7,4) code word can be verified by multiplying each row of the parity-check matrix H by the corresponding bit of C and exclusive OR'ing the products together, resulting in all ZEROS if C is a (7,4) code word:

(101)(1) + (111)(0) + (110)(1) + (011)(0) + (100)(0) + (010)(1) + (001)(1) = 000

In the preferred method of using the trellis 26, confidence ratings are associated with each of the trellis legs. The confidence ratings of the legs in each path are added and the path with the highest cumulative confidence rating, i.e. the "maximum likely" path, represents the best estimate of the group transition cell values.

Figure 6:
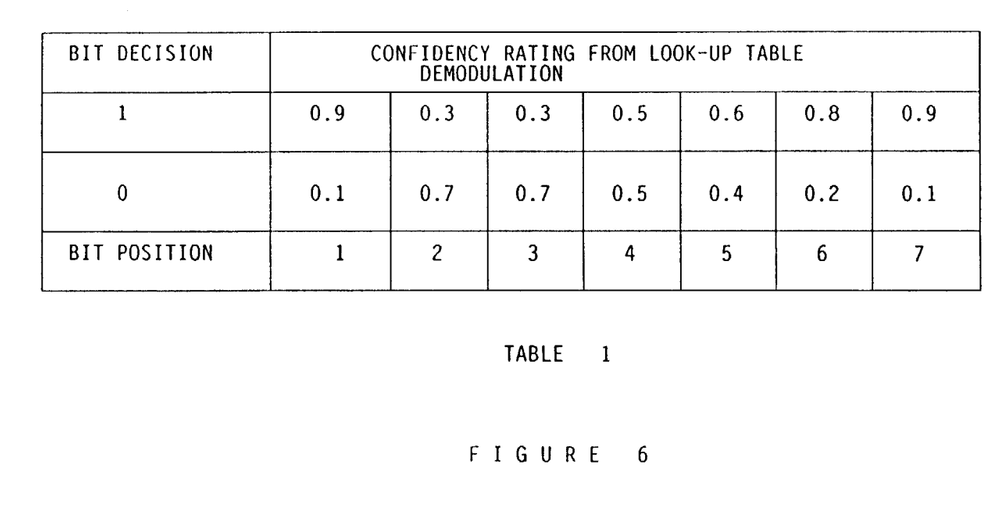
FIG. 6 is a table of transition cell values and associated confidence ratings read from the look-up table shown in FIG. 2.
Figure 7:
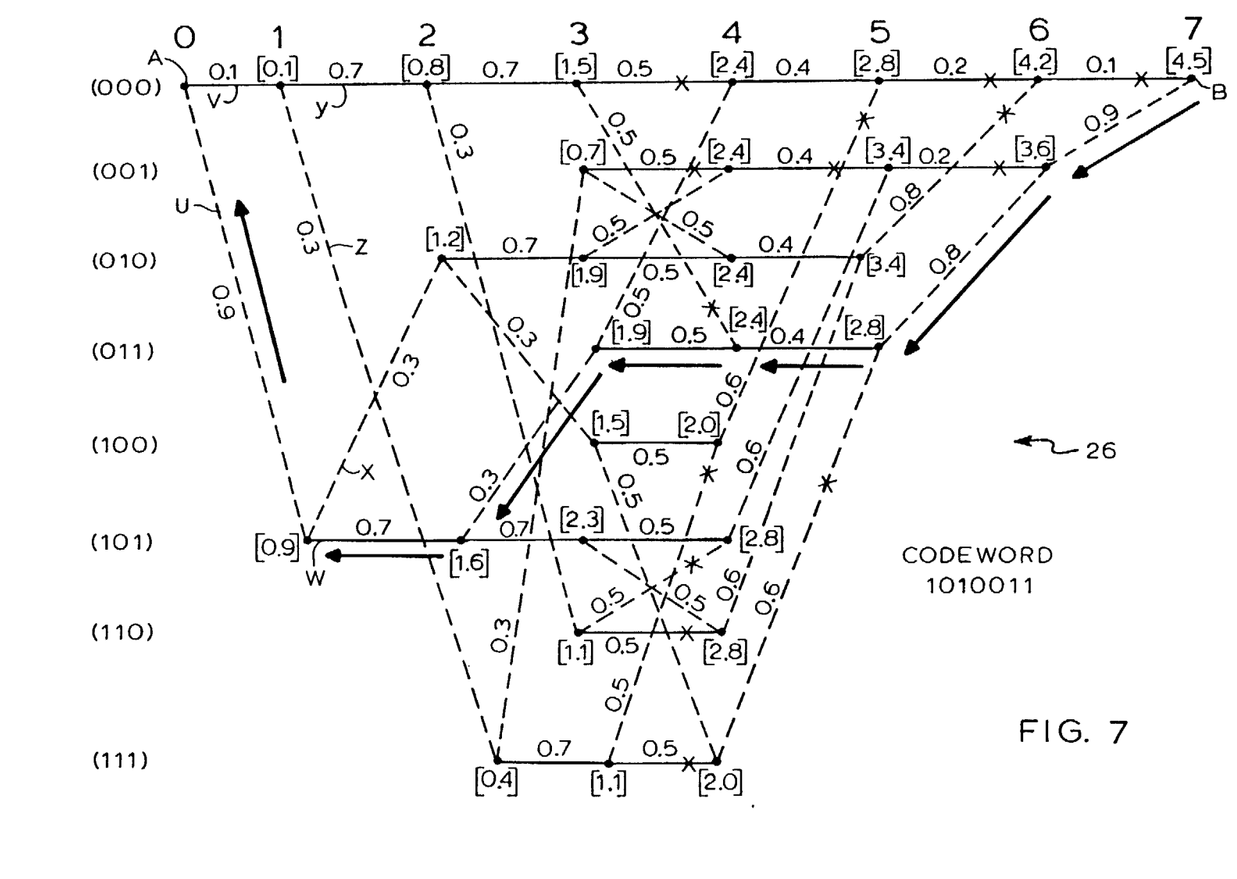
FIG. 7 is a trellis constructed using the cell values and confidence ratings shown in FIG. 6.
Figure 8:
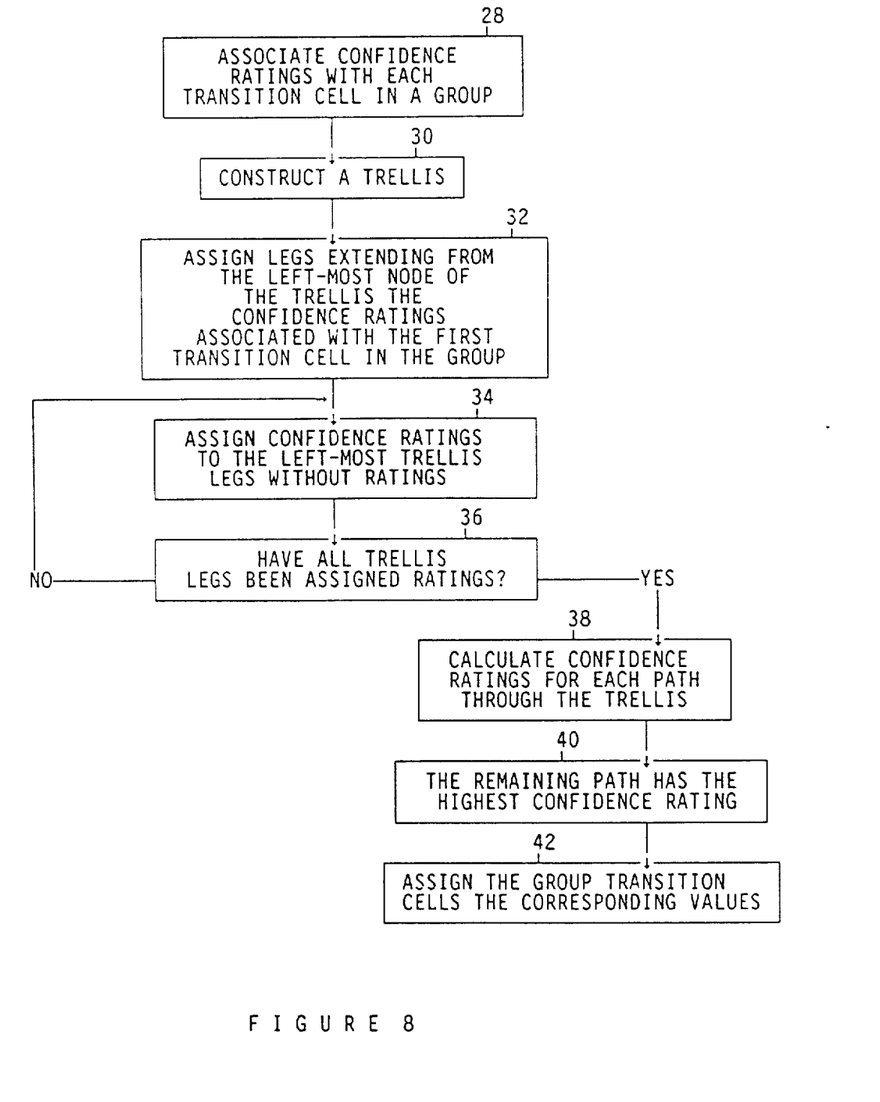
FIG. 8 is a flow chart depicting the steps involved in using the trellis.

As an example, assume that the bits in a code word have the confidence ratings shown in Table 1, FIG. 6 (Step 28, FIG. 8). The corresponding trellis 26 is shown in FIG. 7. FIG. 8 is a flow chart of the algorithm developed for assigning code words to transition cell groups using the trellis 26. With reference to FIGS. 7 and 8, starting at trellis 26 node A the confidence ratings for bit position 1 (FIG. 6) are assigned to each of the legs U and V extending from that node (Steps 30-32). According to Table 1, if the first bit is a ONE it has an associated confidence rating of 0.9 and if it is a ZERO it has an associated confidence rating of 0.1. Thus a rating of 0.9 is assigned to the dashed leg U representing a ONE and a rating of 0.1 is assigned to the solid leg V representing a ZERO. Next, the confidence ratings associated with bit position 2 (FIG. 6) are assigned to the legs extending from the nodes at the ends of legs U and V (Step 34). Thus solid legs W and Y are assigned the 0.7 confidence rating (Table 1) corresponding to a ZERO in bit position 2, and dashed legs X and Z are assigned the 0.3 confidence rating (Table 1) corresponding to a ONE in bit position 2. Confidence ratings are similarly assigned to the remaining legs of the trellis 26 (Step 34-36).

Once the confidence ratings are assigned to each trellis leg, confidence ratings are determined for each node. First the confidence rating of each route leading to a particular node are calculated by adding the ratings of the legs in the various routes. Then, the highest route rating is assigned to the node. For example, there are two routes to node C. One route consists of leg U with a confidence rating of 0.9, leg W with a confidence rating of 0.7, the horizontal leg extending from the end of leg W to a depth three node having a confidence rating of 0.7 and a fourth partially vertical leg extending from the depth three node to a depth four node with a rating of 0.5. This route has a confidence rating of 2.8. A second route consisting of leg V with a confidence rating of 0.1, leg Y with a confidence rating of 0.7, the partially vertical leg extending from the node at depth two to a depth three node with a confidence rating of 0.3 and a horizontal leg from the depth three node to a depth four node with a confidence rating of 0.5. The rating of this route is 1.6. Thus, the node is assigned a confidence rating of 2.8.

Confidence ratings can be determined for each code word, that is, each path, by adding the ratings assigned to each of the legs of a path (Step 38). As the ratings of the various code word paths are calculated, legs leading from the path nodes are "plumed", that is, legs which lead to a node but are not part of the route which produced the node confidence rating are eliminated from consideration as legs of the maximum-likely code word (Step 38). The legs eliminated from examination are indicated by "x's" in FIG. 7. Once a path has been traced from node A to node B, only one code word will be indicated, that is, there is only one remaining path with legs which are still "valid". Each of the other code word paths contain one or more legs which have been eliminated.

The remaining path has the highest cumulative rating and it is assumed to be the best estimate. The resulting decoded code word is read from right to left (Steps 40-42). Thus the code word read from the trellis 26 constructed using Table 1 is 1010011, as shown by the arrows in FIG. 7, and the associated confidence rating is 4.5.

When the next group of seven transition cells are assigned confidence ratings, the new ratings are assigned to the legs of the trellis 26 and then to the nodes, and the next maximum likely code word is decoded (Steps 28-36). The algorithm for assigning code words to the transition cell groups using the trellis 26 may be implemented in software or in firmware. It will be appreciated by those skilled in the art that a method known as the Viterbi Algorithm, or dynamic programming, may also be used to facilitate the determination of the path with the highest confidence rating. This method may be used with both block codes and convolutional codes.

In order to ensure that there will be at least one flux reversal in each group of transition cells, a coset leader, that is, a code word from a supercode of the (n,k) code, may be added to the (n,k) code words prior to recording. The adding of a coset leader in effect shifts the entire (n,k) code by an amount equal to the coset leader. If maximum likelihood decoding is used, the trellis will be traversed from all ZERO node A to a non-ZERO righthand node instead of to node B. Using a (7,4) code without a coset leader the trellis 26 (FIG. 5) has one code word path without flux reversals, namely the horizontal path from node A to node B, path S, containing all ZEROS. The trellis representing a (7,4) code including a coset leader will contain different code word paths, for example, the code word for 0000 data will not be 0000000. The rules for traversing the trellis will, however, be the same. The node used as the path end depends on the coset leader.

The confidence ratings assigned to the transition cells are good estimates for the binary values of the bits recorded in transition cells based on system experience, such as the effect of signals from adjacent transition cells on a particular transition cell signal or the effect of system noise on the transition cell signal. Thus a value assigned to a particular transition cell by means of the look-up table is more likely to be the correct binary value for the transition cell than an interpretation of the transition cell based only on that transition cell signal using prior demodulation methods. It will be appreciated that the new demodulator significantly enhances the quality of signal interpretation, that is, reduces the error caused by the misinterpretation of the recorded analog signal, thereby permitting recording at higher densities without significant increases in the error rate.

The use of the demodulation system described above is not limited to reproducing binary encoded data from analog signals generated by accessing stored data signals. It may be used to recover any type of memory-storable information from an analog signal. For example, the demodulator may be used in speech recognition, where the speech is converted to an analog signal and transition sequences represent syllables. Signals representing syllables preceding and succeeding a particular syllable may affect the signals representing that syllable, and thus a more faithful interpretation of each syllable signal may be made by considering the surrounding signals, i.e. surrounding transition cell sequences. Further, several signal characteristics from a number of transition cells, such as frequency or rate of change of energy, might be used in combination with the amplitude of the signal to optimize the accuracy of signal demodulation in certain applications. The demodulation system would include these characteristics as portions of the interpretation words in order to demodulate the signal.

The foregoing descriptions have been limited to specific embodiments of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A data signal demodulation unit for assigning a binary data value in response to an analog signal comprising:
   A. a table containing a plurality of selectively addressable storage units each storing a binary data value;
   B. sampling means for iteratively sampling the analog signal and generating in response thereto digital symbols representative of said analog signal samples;
   C. a table look-up means connected to said table and said sampling means and responsive to said digital symbols for iteratively forming interpretation words from portions of said digital symbols and using said interpretation words to address said table to obtain therefrom a digital value which is assigned as the binary data value for a portion of said sampled analog signal.

2. The demodulation unit of claim 1 wherein said demodulation unit further comprises means for assigning a binary data value to each addressable storage unit in said table by:
   A. using said sampling means to sample the analog signal associated with known data;

B. forming said interpretation words from said samples;

C. associating said interpretation words with the binary data values of the sampled portions of the known data;

D. storing the binary data value which is associated with a particular interpretation word in a predetermined manner in the table storage unit addressable by said interpretation word.

3. The demodulation unit of claim 2 wherein said means for assigning a binary data value further comprises:

A. assigning the same digital value to each table storage unit which is within a predetermined distance of a storage unit addressable by an interpretation word formed using known data; and B. said distance is the root mean square of the difference between corresponding portions of said digital symbols in two different interpretation words.

4. The demodulation unit of claim 2 wherein the binary data value stored in each of said table storage units is the value most frequently associated with the interpretation word which addresses the storage unit.

5. The demodulation unit of claim 1 wherein said sampling means further includes:

A. reading means for reading from a storage device a transition pattern corresponding to stored data and generating an analog signal representative of the transition pattern;

B. generating means for generating a transition cell signal defining a plurality of iterative transition cells in response to portions of the analog signal with magnitudes within a predetermined range, with each of said transition cells representing a space allocated to the recording of a transition pattern corresponding to one data bit; and C. signal sampling means connected to receive the analog signal and responsive to said generating means for sampling the analog signal in response to said transition cell signal to produce digital symbols representative of said analog signal samples.

6. The demodulation of claim 1 wherein said table look-up means further encodes said interpretation words and uses said encoded interpretation words to address said table.

7. A demodulation system comprising:

A. a mean for receiving an analog signal representative of a transition pattern corresponding to digital data;

B. detecting means for detecting portions of the analog signal with magnitudes within a predetermined range and generating a transition cell signal defining a plurality of iterative cells in response thereto, with each of said transition cells representing a portion of the signal allocated to a transition pattern corresponding to one data bit;

C. sampling means connected to receive the analog signal and responsive to said detecting means for sampling the analog signal a predetermined number of times in response to said transition cell signal to produce digital symbols representative of said analog signal samples;

D. table look-up means responsive to interpretation words formed using portions of said digital symbols for assigning binary data values to portions of the sampled analog signal.

8. A system for assigning a binary data value to a plurality of addressable storage units in a table comprising:

A. a sampling an analog signal associated with known data;

B. forming interpretation words from said samples;

C. associating said interpretation words with the binary data values of the sampled portions of the known data;

D. storing the binary data value which is associated with a particular interpretation word in a predetermined manner in the table storage unit addressable by said interpretation word.

9. The system of claim 7 wherein said table further includes stored confidence ratings associated with said stored binary data values, said confidence ratings being proportional to the frequency with which the binary value is associated with the interpretation word used to assign the binary data values to the sampled portions of the analog signal.

10. The system of claim 9 wherein said table look-up means further includes:

A. storing means for storing the binary data values and associated confidence ratings for a predetermined number of transition cells, said predetermined number of cells forming a group where one of said group cells corresponds to a parity bit;

B. parity-check means for determining the parity of the group; and

C. if the group parity is correct, means for assigning the binary data values in said storing means to the group; or D. if the group parity is not correct, means for inverting the binary data value stored in said storing means with the lowest confidence rating and assigning the resulting binary data values to the group.

11. The system of claim 9 wherein said table look-up means further includes:

A. storing means for storing the binary data values and associated confidence ratings for a predetermined number of transition cells, said predetermined number of cells forming a group;

B. decoding means connected to said storing means for assigning binary data values to said group of transition cells, said decoding means including:

i. means for determining group code words, said code words being possible binary data values for said group;

ii. calculating means for calculating the cumulative confidence ratings for each of said group code words;

iii. selecting means for selecting the group code word with the highest cumulative confidence rating; and iv. means for assigning the code word selected by said selecting means to said group.

12. The system of claim 11 wherein said binary data values assigned by said decoding means to a group are code words of an (n,k) code used to encode the data represented by the analog signal.

13. The system of claim 7 wherein said table look-up means further encodes the interpretation words and uses said encoded interpretation words to address said table.

* * * * *